United States Patent Office 2,894,971
Patented July 14, 1959

2,894,971
POLYFLUOROALKYL p-TOLUENESULFONATES

Jacques G. O'Rear, Stan Haven Subdivision, Md., and Philip D. Faurote, Washington, D.C., assignors to the United States of America as represented by the Secretary of the Navy No Drawing. Application April 8, 1957
Serial No. 651,559

3 Claims. (Cl. 260—456)

(Granted under Title 35, U.S. Code (1952), sec. 266)

The invention described herein may be manufactured and used by or for the Government of the United States of America for governmental purposes without the payment of any royalties thereon or therefor.

This invention relates to new organic fluorine compounds, more particularly to new polyfluoroalkyl-p-toluenesulfonates.

The new compounds of the invention have the general formula:

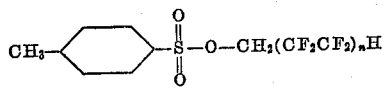

wherein $n$ is an integer from 3 to 10. The molecule of the new tosylates, as is seen from the above formula, contains a single hydrogen atom on the terminal carbon atom of the perfluorocarbon group and a methylene group which links the perfluorocarbon group to oxygen of the sulfonic acid group. They are solids of high boiling point, high density and high refractive index. They are remarkably stable compounds, both thermally and hydrolytically, which properties render them useful as heat transfer fluids. They are also lubricants.

The new tosylates of the invention can be prepared by reaction between a polyfluoroalcohol of the general formula:

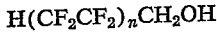

wherein $n$ is an integer from 3 to 10, p-toluene sulfonyl chloride, caustic alkali and water. This procedure is that known for preparing the phenyl tosylates. It is not applicable, however, for preparing the alkyl tosylates. Purification of the new tosylates can be accomplished by distillation at reduced pressures or by crystallization from suitable solvents.

The new polyfluoroalkyl tosylates differ greatly in properties from the alkyl tosylates. They may be distilled at reduced pressures without decomposition, whereas the alkyl tosylates are so thermally unstable that only the lower members thereof may be distilled at reduced pressures without decomposition. For example, n-octyl tosylate distilled under vacuum at 140 to 150° C. undergoes decomposition into octene and p-toluenesulfonic acid. The polyfluoroalkyl tosylates of the invention are resistant to hydrolysis by aqueous alkali, whereas the alkyl tosylates will undergo few of the ordinary displacement reactions observed with alkyl tosylates. They will not, for example, react under reflux with aqueous solutions of $Na_2S$, KBr, KCN, NaHS, etc., to produce, respectively, polyfluoroalkyl sulfides, bromides, nitriles, mercaptans, etc. Neither will they decompose at temperatures of 150 to 250° C. to give symmetrical diethers as do the alkyl tosylates.

The invention is illustrated by the following specific examples in which parts are by weight unless otherwise indicated.

Example 1

Eleven hundred ninety-five and six-tenths parts (3.6 mols) of polyfluoroheptanol, $H(CF_2CF_2)_3CH_2OH$, and 667.3 parts (3.5 mols) of p-toluene sulfonyl chloride were heated in a reflux apparatus at about 50° C. to melt the alcohol. To the fluid mixture thus formed was added, with stirring, 165 parts of 97.1% NaOH (4 mols) dissolved in 500 parts of water. Heat is liberated by the reaction and the temperature of the reaction mixture was not allowed to rise above 55° C. through the controlled addition of the caustic soda over a 3 hour period. The reaction mixture was maintained at 55° C. for 16 hours with continued stirring, after which it was neutralized by the gradual addition thereto, with stirring, of 319 parts of concentrated hydrochloric acid (37%). The mixture was dried by adding toluene and refluxing, the water being collected in a Dean-Stark water trap. The dried mixture was filtered to remove salt crystals. The clear dry filtrate was distilled through a 12 inch Vigreux column to give the product which is dodecafluoroheptyl tosylate of empirical formula p-$CH_3C_6H_4O_2SOCH_2(CF_2CF_2)_3H$. The product boiled within the range of 137 to 142° C. at 0.3 mm. Hg pressure and was obtained in a yield of 92%. A middle fraction of the redistilled product boiled at 126° C./0.5 mm. and melted at ca. 33° C. It has an index of refraction $n_D^{20}$ of 1.4123 and density $d_4^{20}$ of 1.592 (measurements made on super-cooled liquid).

Example 2

One hundred fifty-four and three-tenths parts (.29 mol) of polyfluoroundecanol, $H(CF_2CF_2)_5CH_2OH$, and 66.7 parts (.35 mol) of p-toluenesulfonyl chloride were added to a vessel equipped with reflux condenser and stirrer and heated at about 60° C. until the alcohol melted. 20.6 parts of 97.1% NaOH (.5 mol) was dissolved in 60 parts of water and added to the mixture containing the melted alcohol over a period of 2½ hours with stirring. The temperature of the reaction mixture was maintained at 60–70° C. through gradual addition of the caustic soda solution. The reaction mixture was stirred at 65° C. for 16 hours, cooled, and taken up in a large volume of ethyl ether. The supernatant ether extract was first washed with dilute hydrochloric acid to neutralize the caustic soda therein and then washed several times with water. The washed extract was dried over magnesium sulfate and distilled through a 12 inch Vigreux column to give the product which is 1H, 1H, 11H eicosafluoroundecyl tosylate of empirical formula p-$CH_3C_6H_4O_2SOCH_2(CF_2CF_2)_5H$. The product boiled in the range of 148–155° C./0.3 mm. Hg, melted in the range of 77.2–79.8° C. and was obtained in a yield of 79%. A middle fraction of the redistilled product boiled at 149° C./0.5 mm. and melted at 77–80° C.

The procedures of the above examples are general for the preparation of the new polyfluoroalkyl p-toluene sulfonates of the above general formula, further examples of which are the tosylates of the formulae

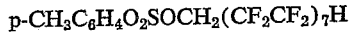

and

The novel polyfluoroalkyl tosylates are intermediates for other valuable polyfluoroalkyl compounds through formation of the corresponding polyfluoroalkyl iodides which are made by standard procedures from the new polyfluoroalkyl tosylates.

These interesting polyfluoroalkyl iodides undergo an unusual type of homolytic fission at higher temperatures, for example at 150° C. and above, to give free radical reactions, for example

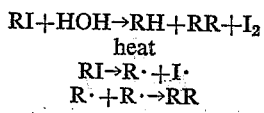

They also react with sulfur according to the equation:

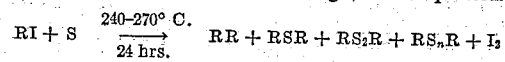

and with selenium according to the equation:

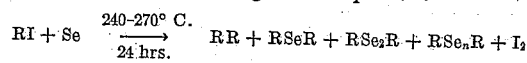

The mechanism and stoichiometry of the foregoing reactions is discussed in applicants' article in J. American Chemical Society, 78, 4999 (1956). Certain interesting properties of the sulfur and selenium derivatives are disclosed in the foregoing article.

While in the foregoing description certain specific embodiments of the invention have been described, it is not intended that the same shall be taken in limitation of the invention except as may be defined in the appended claims.

What is claimed is:

1. A polyfluoroalkyl-p-toluenesulfonate of the general formula:

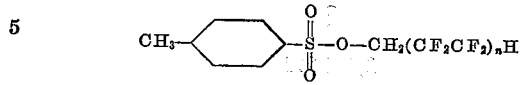

wherein $n$ is an integer from 3 to 10.

2. The omega-hydroperfluoroheptyl-p-toluenesulfonate of the formula

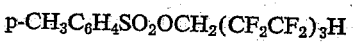

3. The omega-hydroperfluoroundecyl-p-toluenesulfonate of the formula

References Cited in the file of this patent
UNITED STATES PATENTS

| | | |
|---|---|---|
| 2,559,628 | Joyce | July 10, 1951 |
| 2,666,797 | Husted et al. | Jan. 19, 1954 |

OTHER REFERENCES

Edgell et al.: J.A.C.S., vol. 77 (1955), pp. 4899–4902.